United States Patent
Singh et al.

(10) Patent No.: US 12,223,948 B2
(45) Date of Patent: Feb. 11, 2025

(54) TOKEN CONFIDENCE SCORES FOR AUTOMATIC SPEECH RECOGNITION

(71) Applicant: SoundHound, Inc., Santa Clara, CA (US)

(72) Inventors: Pranav Singh, Sunnyvale, CA (US); Saraswati Mishra, San Jose, CA (US); Eunjee Na, Busan (KR)

(73) Assignee: SoundHound, Inc., Santa Clara, CA (US)

( * ) Notice: Subject to any disclaimer, the term of this patent is extended or adjusted under 35 U.S.C. 154(b) by 230 days.

(21) Appl. No.: 17/649,810

(22) Filed: Feb. 3, 2022

(65) Prior Publication Data

US 2023/0245649 A1 Aug. 3, 2023

(51) Int. Cl.
*G10L 15/18* (2013.01)
*G10L 15/02* (2006.01)
*G10L 15/26* (2006.01)

(52) U.S. Cl.
CPC .......... *G10L 15/1815* (2013.01); *G10L 15/02* (2013.01); *G10L 15/26* (2013.01); *G10L 2015/025* (2013.01)

(58) Field of Classification Search
CPC ..... G10L 15/1815; G10L 15/02; G10L 15/26; G10L 2015/025
See application file for complete search history.

(56) References Cited

U.S. PATENT DOCUMENTS

| | | | |
|---|---|---|---|
| 8,812,316 B1* | 8/2014 | Chen | G10L 15/183 704/265 |
| 10,452,782 B1 | 10/2019 | Kumar et al. | |
| 10,515,155 B2 | 12/2019 | Bachrach et al. | |
| 11,580,959 B2* | 2/2023 | Freed | G10L 15/187 |
| 2002/0082833 A1* | 6/2002 | Marasek | G10L 15/08 704/251 |
| 2002/0133340 A1* | 9/2002 | Basson | G10L 15/22 704/E15.04 |
| 2006/0129381 A1 | 6/2006 | Wakita | |
| 2006/0195318 A1* | 8/2006 | Stanglmayr | G10L 15/22 704/235 |
| 2007/0033026 A1* | 2/2007 | Bartosik | G10L 15/26 704/E15.04 |

(Continued)

FOREIGN PATENT DOCUMENTS

EP 3486842 A1 5/2019

OTHER PUBLICATIONS

Extended European Search Report of EP21180858.9 by EPO dated Apr. 5, 2022.

(Continued)

*Primary Examiner* — Brian L Albertalli

(57) ABSTRACT

Methods and systems for correction of a likely erroneous word in a speech transcription are disclosed. By evaluating token confidence scores of individual words or phrases, the automatic speech recognition system can replace a low-confidence score word with a substitute word or phrase. Among various approaches, neural network models can be used to generate individual confidence scores. Such word substitution can enable the speech recognition system to automatically detect and correct likely errors in transcription. Furthermore, the system can indicate the token confidence scores on a graphic user interface for labeling and dictionary enhancement.

15 Claims, 11 Drawing Sheets

(56) References Cited

U.S. PATENT DOCUMENTS

| | | | |
|---|---|---|---|
| 2007/0208567 A1* | 9/2007 | Amento | G10L 15/22 |
| | | | 704/E15.04 |
| 2010/0106505 A1* | 4/2010 | Shu | G10L 15/187 |
| | | | 704/E15.001 |
| 2011/0218802 A1* | 9/2011 | Bouganim | G10L 15/04 |
| | | | 704/E15.005 |
| 2013/0018649 A1 | 1/2013 | Deshmukh et al. | |
| 2015/0179169 A1* | 6/2015 | John | G10L 15/1815 |
| | | | 704/257 |
| 2016/0155436 A1* | 6/2016 | Choi | G10L 15/32 |
| | | | 704/232 |
| 2016/0180242 A1 | 6/2016 | Byron et al. | |
| 2016/0196820 A1 | 7/2016 | Williams et al. | |
| 2017/0200458 A1* | 7/2017 | Kang | G10L 15/02 |
| 2017/0286869 A1 | 10/2017 | Zarosim et al. | |
| 2018/0061408 A1 | 3/2018 | Andreas et al. | |
| 2018/0068653 A1* | 3/2018 | Trawick | G10L 15/16 |
| 2018/0121419 A1 | 5/2018 | Lee et al. | |
| 2018/0329883 A1 | 11/2018 | Leidner et al. | |
| 2019/0108257 A1* | 4/2019 | Lefebure | G06F 40/211 |
| 2019/0147104 A1 | 5/2019 | Wu et al. | |
| 2019/0155905 A1 | 5/2019 | Bachrach et al. | |
| 2019/0251165 A1 | 8/2019 | Bachrach et al. | |
| 2019/0278841 A1* | 9/2019 | Pusateri | G10L 15/26 |
| 2019/0370323 A1* | 12/2019 | Davidson | G10L 15/26 |
| 2020/0004787 A1 | 1/2020 | Gupta et al. | |
| 2020/0065334 A1 | 2/2020 | Rodriguez et al. | |
| 2020/0142888 A1 | 5/2020 | Alakuijala et al. | |
| 2020/0142959 A1 | 5/2020 | Mallinar et al. | |
| 2020/0143247 A1 | 5/2020 | Jonnalagadda et al. | |
| 2020/0167379 A1 | 5/2020 | Faruqui et al. | |
| 2020/0334334 A1 | 10/2020 | Keskar et al. | |
| 2021/0042614 A1 | 2/2021 | Walters et al. | |
| 2021/0056266 A1 | 2/2021 | Ma et al. | |
| 2021/0110816 A1 | 4/2021 | Choi et al. | |
| 2021/0118436 A1* | 4/2021 | Kim | G06N 3/08 |
| 2021/0141798 A1 | 5/2021 | Henderson | |
| 2021/0141799 A1 | 5/2021 | Steedman Henderson | |
| 2021/0142164 A1 | 5/2021 | Liu et al. | |
| 2021/0142789 A1* | 5/2021 | Gurbani | G10L 15/16 |
| 2021/0149993 A1 | 5/2021 | Torres | |
| 2021/0151039 A1* | 5/2021 | Wu | G10L 15/26 |
| 2021/0209304 A1 | 7/2021 | Yang et al. | |
| 2021/0264115 A1 | 8/2021 | Wang et al. | |
| 2021/0397610 A1 | 12/2021 | Singh et al. | |
| 2022/0004717 A1 | 1/2022 | Park et al. | |
| 2022/0059095 A1* | 2/2022 | Faria | G10L 15/183 |
| 2022/0093088 A1 | 3/2022 | Rangarajan Sridhar et al. | |
| 2022/0165257 A1 | 5/2022 | Singh et al. | |
| 2022/0215159 A1 | 7/2022 | Qian et al. | |
| 2023/0044079 A1 | 2/2023 | Bala | |
| 2023/0143110 A1 | 5/2023 | Han et al. | |
| 2023/0186898 A1* | 6/2023 | Weisz | G10L 15/08 |
| | | | 704/257 |

OTHER PUBLICATIONS

Agnihotri, Souparni. "Hyperparameter Optimization on Neural Machine Translation." (2019).

Cer, Daniel, Yinfei Yang, Sheng-yi Kong, Nan Hua, Nicole Limtiaco, Rhomni St John, Noah Constant et al. "Universal Sentence Encoder for English." EMNLP 2018 (2018): 169.

Hashemi, Homa B., Amir Asiaee, and Reiner Kraft. "Query intent detection using convolutional neural networks." In International Conference on Web Search and Data Mining, Workshop on Query Understanding. 2016.

Karagkiozis, Nikolaos. "Clustering Semantically Related Questions." (2019).

Klein, Guillaume, François Hernandez, Vincent Nguyen, and Jean Senellart. "The OpenNMT neural machine translation toolkit: 2020 edition." In Proceedings of the 14th Conference of the Association for Machine Translation in the Americas (AMTA 2020), pp. 102-109. 2020.

Kriz, Reno, Joao Sedoc, Marianna Apidianaki, Carolina Zheng, Gaurav Kumar, Eleni Miltsakaki, and Chris Callison-Burch. "Complexity-weighted loss and diverse reranking for sentence simplification." arXiv preprint arXiv:1904.02767 (2019).

Lin, Ting-En, Hua Xu, and Hanlei Zhang. "Discovering new intents via constrained deep adaptive clustering with cluster refinement." In Proceedings of the AAAI Conference on Artificial Intelligence, vol. 34, No. 05, pp. 8360-8367. 2020.

OpenNMT, Models—OpenNMT, https://opennmt.net/OpenNMT/training/models/.

Reimers, Nils, and Iryna Gurevych. "Sentence-bert: Sentence embeddings using siamese bert-networks." arXiv preprint arXiv:1908.10084 (2019).

Vaswani, Ashish, Noam Shazeer, Niki Parmar, Jakob Uszkoreit, Llion Jones, Aidan N. Gomez, Lukasz Kaiser, and Illia Polosukhin. "Attention is all you need." arXiv preprint arXiv:1706.03762 (2017).

Wang, Peng, Bo Xu, Jiaming Xu, Guanhua Tian, Cheng-Lin Liu, and Hongwei Hao. "Semantic expansion using word embedding clustering and convolutional neural network for improving short text classification." Neurocomputing 174 (2016): 806-814.

Xu, Jiaming, Bo Xu, Peng Wang, Suncong Zheng, Guanhua Tian, and Jun Zhao. "Self-taught convolutional neural hetworks for short text clustering." Neural Networks 88 (2017): 22-31.

U.S. Appl. No. 17/455,727, filed Nov. 19, 2021, Pranav Singh.

Dyer, Chris, Adhiguna Kuncoro, Miguel Ballesteros, and Noah A. Smith. "Recurrent neural network grammars." arXiv preprint arXiv:1602.07776 (2016).

Geitgey, A. "Faking the News with Natural Language Processing and GPT-2." Medium. Sep. 27, 2019.

Guu, Kelvin, Tatsunori B. Hashimoto, Yonatan Oren, and Percy Liang. "Generating sentences by editing prototypes." Transactions of the Association for Computational Linguistics 6 (2018): 437-450.

Juraska, Juraj, and Marilyn Walker. "Characterizing variation in crowd-sourced data for training neural language generators to produce stylistically varied outputs." arXiv preprint arXiv:1809.05288 (2018).

Lebret, Rémi, Pedro O. Pinheiro, and Ronan Collobert. "Simple image description generator via a linear phrase-based approach." arXiv preprint arXiv:1412.8419 (2014).

Lewis, Mike, Yinhan Liu, Naman Goyal, Marjan Ghazvininejad, Abdelrahman Mohamed, Omer Levy, Ves Stoyanov, and Luke Zettlemoyer. "Bart: Denoising sequence-to-sequence pre-training for natural language generation, translation, and comprehension." arXiv preprint arXiv:1910.13461 (2019).

Li, Zichao, Xin Jiang, Lifeng Shang, and Qun Liu. "Decomposable neural paraphrase generation." arXiv preprint arXiv:1906.09741 (2019).

Radford, Alec, Jeffrey Wu, Rewon Child, David Luan, Dario Amodei, and Ilya Sutskever. "Language models are unsupervised multitask learners." OpenAI blog 1, No. 8 (2019): 9.

Rajapakse, T. "To Distil or Not to Distil: BERT, ROBERTa, and XLNet" towardsdatascience.com. Feb. 7, 2020.

Shaw, Andrew. "A multitask music model with bert, transformer-xl and seq2seq."

Tran, Van-Khanh, and Le-Minh Nguyen. "Semantic refinement gru-based neural language generation for spoken dialogue systems." In International Conference of the Pacific Association for Computational Linguistics, pp. 63-75. Springer, Singapore, 2017.

Vaswani, Ashish, Noam Shazeer, Niki Parmar, Jakob Uszkoreit, Llion Jones, Aidan N. Gomez, Łukasz Kaiser, and Illia Polosukhin. "Attention is all you need." In Advances in neural information processing systems, pp. 5998-6008. 2017.

Vinyals, Oriol, Alexander Toshev, Samy Bengio, and Dumitru Erhan. "Show and tell: A neural image caption generator." In Proceedings of the IEEE conference on computer vision and pattern recognition, pp. 3156-3164. 2015.

Wen, Tsung-Hsien, Milica Gasic, Nikola Mrksic, Lina M. Rojas-Barahona, Pei-Hao Su, David Vandyke, and Steve Young. "Multi-domain neural network language generation for spoken dialogue systems." arXiv preprint arXiv:1603.01232 (2016).

Wen, Tsung-Hsien, Milica Gašic, Nikola Mrkšic, Lina M. Rojas-Barahona, Pei-Hao Su, David Vandyke, and Steve Young. "Toward multi-domain language generation using recurrent neural net-

(56) References Cited

OTHER PUBLICATIONS works." In NIPS Workshop on Machine Learning for Spoken Language Understanding and Interaction. 2015.
Zhang, Yaoyuan, Zhenxu Ye, Yansong Feng, Dongyan Zhao, and Rui Yan. "A constrained sequence-to-sequence neural model for sentence simplification." arXiv preprint arXiv:1704.02312 (2017).
Zheng, Renjie, Mingbo Ma, and Liang Huang. "Multi-reference training with pseudo-references for neural translation and text generation." arXiv preprint arXiv:1808.09564 (2018).
Examination Report by EPO of European counterpart patent application No. 21180858.9, dated Sep. 10, 2024.
Li, Zichao, et al., "Decomposable neural paraphrase generation." arXiv preprint arXiv:1906.09741 (Year: 2019).

* cited by examiner

300 Carnegie Mellon University's standard English phoneme codes

| Phoneme | Example | Token Translation |
|---------|---------|-------------------|
| AA | odd | AA D |
| AE | at | AE T |
| AH | hut | HH AH T |
| AO | ought | AO T |
| AW | cow | K AW |
| AY | hide | HH AY D |
| B | be | B IY |
| CH | cheese | CH IY Z |
| D | dee | D IY |
| DH | thee | DH IY |
| EH | Ed | EH D |
| ER | hurt | HH ER T |
| EY | ate | EY T |
| F | fee | F IY |
| G | green | G R IY N |
| HH | he | HH IY |
| IH | it | IH T |
| IY | eat | IY T |
| JH | gee | JH IY |
| K | key | K IY |
| L | lee | L IY |
| M | me | M IY |
| N | knee | N IY |

```
┌─────────────────────────────────────────────────────────────┐
│ Utterance 502: "Tell me symptoms of coke at nineteen."      │
└─────────────────────────────────────────────────────────────┘
                              ↓
┌─────────────────────────────────────────────────────────────┐
│ Acoustic Analysis 504: T EH L M IY S IH M P T AH M Z AH V K │
│ OW K AE T N AY N T IY N .                                   │
└─────────────────────────────────────────────────────────────┘
                              ↓
┌─────────────────────────────────────────────────────────────┐
│ Tokenization 506: T EH L ↔ M IY ↔ S IH M P T AH M Z ↔ AH V │
│ ↔ K OW K ↔ AE T ↔ N AY N T IY N                             │
└─────────────────────────────────────────────────────────────┘
                              ↓
┌─────────────────────────────────────────────────────────────┐
│ Token and Phrase Scoring 508: T EH L=0.7 ↔M IY=0.8↔ S IH M  │
│ P T AH M Z=0.7 ↔ AH V =0.7↔ [K OW K ↔ AE T ↔ N AY N T       │
│ IY N]=0.2                                                   │
└─────────────────────────────────────────────────────────────┘
                              ↓
┌─────────────────────────────────────────────────────────────┐
│ Phrase Substitution 510: T EH L=0/7 ↔M IY=0.8↔ S IH M P T AH│
│ M Z=0.7 ↔ AH V =0.7↔ [K OW VIY D ↔ N AY N T IY N]=0.8       │
└─────────────────────────────────────────────────────────────┘
                              ↓
┌─────────────────────────────────────────────────────────────┐
│ Selected Transcription 512: "Tell me symptoms of Covid-19"  │
└─────────────────────────────────────────────────────────────┘
```

*FIG. 5*

TOKEN CONFIDENCE SCORES FOR AUTOMATIC SPEECH RECOGNITION

TECHNICAL FIELD

The present subject matter is in the field of artificial intelligence systems and Automatic Speech Recognition (ASR). More particularly, embodiments of the present subject matter relate to methods and systems for improved automatic speech recognition.

BACKGROUND

Voice-enabled interfaces for electronic devices have become more common in recent years. They enable a user to use speech to interact with electronic devices such as virtual assistants. As a natural mode of human communication, voice-enabled interfaces offer many benefits over traditional human-computer interfaces such as a keyboard and mouse.

The voice-enabled interfaces can employ an Automatic Speech Recognition (ASR) system to transcribe speech into text based on acoustic models and language models. However, speech recognition is often erroneous due to the ever-expanding diversity of domains, unclear speech, and other interfering factors, all of which can cause the ASR to not correctly interpret the speech audio.

SUMMARY OF THE INVENTION

The following specification describes many aspects of improved ASR and example embodiments that illustrate some representative combinations with optional aspects. Some examples are systems of process steps or systems of machine components for automated token scoring and its applications. These can be implemented with computers that execute software instructions stored on non-transitory computer-readable media.

The present subject matter describes improved approaches to automatically correct a likely erroneous word or phrase in a speech transcription by assigning token confidence scores to individual tokens such as words, phrases, or logographic characters (e.g., Chinese characters). For example, a low-score word can be an incorrectly recognized word that has a low probability of being correct in the text transcription. On the other hand, a high-score substitution word can be more likely correct in the text transcription. According to some embodiments, the system can correct a phrase with incorrect words via phrase confidence scores. According to some embodiments, various computer-implemented methods and approaches, including neural network models, can be trained to determine and substitute the probably wrong word or phrase.

As such, the token confidence scores and their applications can reduce the recognition errors that are common yet difficult to overcome for ASR. Such recognition errors can be caused by numerous acoustic uncertainties such as foreign accents, unclear speech, background noises, unfamiliar domains, or new words that were unknown to the ASR system.

Accordingly, the ASR can be more intelligent in understanding a user's command as it can overcome the acoustic uncertainties. The present subject matter can improve the accuracy and effectiveness of speech recognition, thus enhancing the user experience of a voice-enabled interface.

Furthermore, the system can indicate the token confidence scores on a graphic user interface for data labeling and dictionary enhancement. For example, the token confidence scores can be displayed in various colors or fonts to highlight their status, e.g., low score or high score.

According to some embodiments, the respective token confidence scores can be used to detect data labeling errors. For example, a low confidence score can indicate there is a labeling error and thus can be highlighted in red. According to some embodiments, the system can determine that a token with a low token confidence score is a new word that was not previously recorded in the pronunciation dictionary.

A computer implementation of the present subject matter comprises a computer-implemented method for speech recognition, which comprises receiving, at an automatic speech recognition system, an utterance. The utterance can comprise acoustic uncertainties, such as background noises. The method further comprises generating a phoneme sequence of the utterance based on an acoustic model, segmenting the phoneme sequence into a token sequence that represents the phoneme sequence based on a pronunciation dictionary, assigning respective token confidence scores to individual tokens in the token sequence, wherein the token confidence score represents a level of confidence of the correct representation of a tokenized word.

With the assigned token confidence scores, the system can determine that a first confidence score associated with a token is lower than a predetermined threshold. Furthermore, the system can determine a substitute token associated with a second confidence score that is higher than the first confidence score and update the token sequence by replacing the token with the substitute token.

According to some embodiments, the system can generate one or more hypothesized phoneme sequences, each of which is subject to the token scoring, evaluation and substitution as described herein. Besides the token confidence scores, the system can further assign respective sentence-level acoustic scores to each probable phoneme sequence to indicate the respective likelihood of correctness to represent the utterance. The sentence-level acoustic scores are acoustic scores assigned or predicted by the acoustic model to estimate the accuracy of the phoneme sequence. According to some embodiments, the system can generate one or more hypothesized text transcriptions of the utterance based on one or more phoneme sequences.

According to some embodiments, after updating the token sequence by replacing the low-score token with the substitute token, the system can reassign the respective sentence-level acoustic scores to the one or more hypothesized phoneme sequences. Based on the updated acoustic scores, the system can select a phoneme sequence with the highest score as the probable representation for the utterance. According to some embodiments, one or more phoneme sequences above a predetermined threshold can be subjected to further calculations, such as by statistical language models or natural language understanding (NLU) models. According to some embodiments, a hybrid score based on the token confidence score and the sentence-level acoustic scores can be used to determine the candidate phoneme sequences.

According to some embodiments, a confidence score model can assign the token confidence scores. The confidence score model can be a neural network model that has been trained by datasets to assign the token confidence scores. For example, a trained or finetuned binary classifier model can be used to infer probabilities of the correctness of the individual tokens with assigned token confidence scores. The classifier model can be trained by positive datasets, negative datasets and/or unlabeled datasets. According to some embodiments, the positive datasets comprise confirmed utterance texts combined with the utterance.

According to some embodiments, a translation model can determine a substitute token for a low-score token and update the phoneme sequence. The translation model can be a sequence-to-sequence neural network model that has been trained by relevant datasets. For example, the training datasets can comprise lower-score textual transcriptions mapped to higher-score transcriptions for an utterance.

According to some embodiments, the training datasets for the confidence score model and the translation model can comprise foreign language data. Training with foreign language data can improve the effectiveness of the models in working with languages that do not have a lot of available data.

Besides the model-based method, other methods and approaches can be adopted, such as posterior-based or utterance verification-based methods or approaches. According to some embodiments, the token confidence score can be based on one or more of a token sequence probability analysis, acoustic probability analysis, and semantic analysis.

Another computer implementation of the present subject matter comprises a computer-implemented method for speech recognition, which comprises receiving, at an acoustic model of an automatic speech recognition system, an utterance, generating a plurality of tokens and phrases representing the utterance, assigning respective token confidence scores and phrase confidence scores to the plurality of tokens and phrases, wherein the token confidence score and phrase confidence score represent a level of confidence of the correct representation of a word or phrase.

With the assigned token confidence scores and phrase confidence scores, the system can determine that a first confidence score associated with a phrase is lower than a predetermined threshold. In some embodiments, the threshold can be the confidence score associated with a different token or phrase. Furthermore, the system can determine a substitute phrase associated with a second confidence score that is higher than the first confidence score and update the token sequence by replacing the phrase with the substitute phrase, e.g., via a translation model.

Another computer implementation of the present subject matter comprises a computer-implemented method for speech recognition, which comprises generating a phoneme sequence of a received utterance by at an acoustic model of an automatic speech recognition system, generating a token sequence that represents the phoneme sequence based on a pronunciation dictionary, assigning respective token confidence scores to individual tokens in the token sequence, wherein the token confidence score represents a level of confidence of the correct representation of a tokenized word, and indicating the respective token confidence scores associated with the individual tokens in the token sequence on a graphic user interface.

Another computer implementation of the present subject matter comprises a computer-implemented method for processing speech, comprising: recognizing a hypothesized linguistic token sequence from speech audio, generating token confidence scores for tokens in the token sequence from the speech audio corresponding to the tokens, translating the token sequence to a translated sequence of tokens using a translation model that outputs the translated sequence in dependence upon the token sequence and the token confidence scores, comparing the probabilities of the token sequence and the translated sequence according to a statistical language model, and providing, as a transcription, the translated sequence if its probability is higher than the probability of the token sequence.

According to some embodiments, the method further comprises computing a phoneme sequence and phoneme confidence scores corresponding to phonemes in the phoneme sequence from the speech audio using an acoustic model, and tokenizing the phoneme sequence using a pronunciation dictionary to create the token sequence. According to some embodiments, the method further comprises computing the token confidence scores from the phoneme confidence scores of the constituent phonemes of the tokens.

According to some embodiments, the method further comprises computing a plurality of translated sequences of the token sequence and comparing the statistical language model probability of the plurality of translated sequences to select the one with the highest probability.

According to some embodiments, the respective token confidence scores can be used to prioritize transcription for labeling transcriptions of speech. For example, the token confidence scores can be shown with different colors, e.g., red for a low token confidence score and green for a high confidence token score. The token confidence scores can also be shown.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings and in which:

FIG. 3 shows an exemplary listing of the Carnegie Mellon University's standard English phoneme codes;

FIG. 5 shows an exemplary diagram of phrase confidence score assignment and substitution, according to one or more embodiments of the present subject matter;

DETAILED DESCRIPTION

The present subject matter pertains to improved approaches for an automatic speech recognition system wherein words/phrases recognized with low confidence can be replaced with more likely words/phrases. By substituting a low-confidence word with a high-confidence word in a hypothetical phoneme sequence or text transcription, the system can deliver a more accurate and probable transcription of an utterance. The present subject matter can provide an intelligent ASR system that can effectively reduce recognition errors caused by frequently-presented acoustic uncertainties. Examples of such acoustic uncertainties include, for example, speaker accents, unclear speech, background noises, or new words. Embodiments of the present subject matter are discussed below with reference to FIGS. 1-10.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for generating token confidence scores and its applications. These can be implemented with computers that execute software instructions stored on non-transitory computer-readable media. Improved systems for automated correction of a speaker's utterance or speech can have one or more of the features described below. The tokens to be scored are linguistic tokens that represent words, phrases, characters, or character sequences that represent commonly known concepts within a particular natural language.

Figure 1:
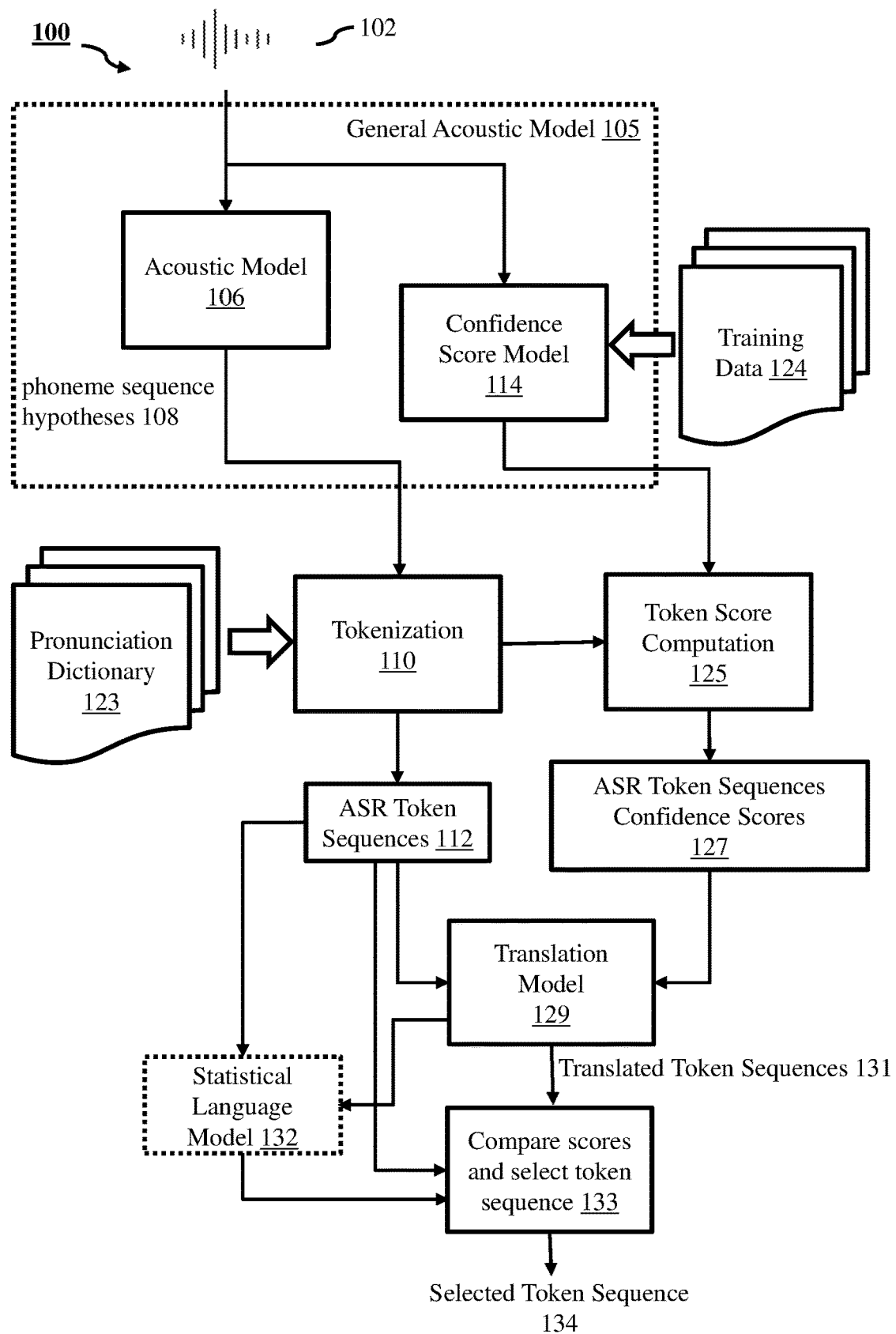
FIG. 1 shows an exemplary diagram of an automatic speech recognition system with automated word/phrase correction based on token confidence scores, according to one or more embodiments of the present subject matter.

FIG. 1 shows an exemplary diagram of an automatic speech recognition system 100 with automated word/phrase correction based on token confidence scores. An ASR system 100 can be implemented by various devices or services to provide a voice-enabled interface. For example, a virtual assistant can adopt a voice-enabled interface via the ASR system 100, which can perform tasks or services for a user based on his/her queries or spoken inputs. The virtual assistant can be a software agent that can be integrated into different types of devices and platforms. For example, a virtual assistant can be incorporated into smart speakers. It can also be integrated into voice-enabled applications for specific companies, e.g., SoundHound's Houndify App for its partners.

As shown in FIG. 1, a microphone associated with the ASR system 100 can capture soundwave recording of an utterance or a voice query. Upon receiving the soundwave recording, the ASR system 100 can generate speech audio 102 based on the utterance. Speech audio 102 can comprise time-series measurements, such as time series pressure fluctuation measurements and/or time series frequency measurements. For example, one or more channels of Pulse Code Modulation (PCM) data may be captured at a predefined sampling rate where samples are represented by a predefined number of bits. Audio data may be processed following capture, for example, by filtering in one or more of the time and frequency domains, by applying beamforming and noise reduction, and/or by filtering and normalization. In one case, audio data may be converted into measurements over time in the frequency domain by performing the Fast Fourier Transform to create one or more frames of spectrogram data. According to some embodiments, filter banks may be applied to determine values for one or more frequency domain features, such as Mel-Frequency Cepstral Coefficients. Speech audio 102 as described herein for speech recognition, may comprise a measurement made within an audio processing pipeline. An example of such audio data can be a spectrogram as shown in FIG. 2B.

As shown in FIG. 1, the ASR system 100 can comprise acoustic model 106 in connection with pronunciation models, statistical language models, and grammars for inferring the meaning of an utterance/query/command. Acoustic model 106 can be a statistical model that is based on hidden Markov models and/or neural network models, which infer the probabilities of phonemes in query audio. Examples of such acoustic models comprise convolutional neural network (CNN) and recurrent neural network (RNN). In some examples, an acoustic model is trained on audio waveform samples as input. In some examples, an acoustic model is trained on frequency power spectrograms computed from overlapping frames of audio samples.

According to some embodiments, acoustic model 106 can generate one or more phoneme sequence hypotheses or phoneme sequences 108 based on speech audio 102. It is common that an utterance can be associated with several phoneme sequence hypotheses that are likely transcriptions. For example, the audio of "Hello, World" can be associated with both "HELO WERLT" or "HELO WERLD."

According to some embodiments, the ASR system 100 can assign respective token confidence scores or phoneme confidence scores to individual tokens/phonemes in the phoneme sequence hypotheses 108. The token confidence score can indicate an estimated transcription accuracy for an individual tokenized word or a phoneme. According to some embodiments, the token confidence score can be binary scores between 0-1.

Various methods and approaches or a combination of several methods can be used to generate the token confidence scores. For example, posterior probabilities of subword units can be used to generate the token confidence scores. In another example, utterance verification in continuous speech recognition can be used to generate the token confidence score. For example, the token confidence score can be the arithmetic mean (computed over the utterance) of the phone log posterior probabilities.

According to some embodiments, a trained neural network model, such as a confidence score model 114, can generate the token confidence scores. For example, a trained or finetuned binary classifier model can infer the accuracy probabilities of the individual tokens with assigned token confidence scores. The classifier model can be trained by training data 124, including positive datasets, negative datasets and/or unlabeled datasets. According to some embodiments, the positive datasets comprise confirmed transcription combined with the utterance.

According to some embodiments, the classifier model can be trained with data that is specific for a domain or an application. Because the general pattern of a language can be different from the specific language used in a particular domain or application, the classifier model can be finetuned for its own domain and target purpose. For example, a classifier model for a virtual assistant in an automobile can be trained with transcriptions and voice queries that are typical for a driver. A classifier model for a medical transcription service can be trained with transcriptions of diagnoses and prescribed treatments and voice queries that are typical in a medical setting. According to some embodiments, the training datasets can be multi-domain so that the confidence score model can be a general one.

Internationally, there is more training data in the English language than any other. However, the training datasets for the confidence score model can comprise other language data, e.g., French, Spanish, and Chinese and the associated language-specific phoneme sets and acoustic models. Finetuning an English model with a non-English language data can improve the effectiveness of confidence score models in working with languages that do not have a lot of available data.

According to some embodiments, via tokenization 110, the ASR system 100 can segment a phoneme sequence into a token sequence based on one or more phoneme pronunciation dictionaries 123. The pronunciation dictionary lists linguistic tokens and, for each, one or more sequences of constituent phonemes that would be pronounced as that token. For example, the word token "tomato" may be listed with pronunciations T OW M EY T OW and T OW M AA T OW. For another example, the Chinese character 的 in may be listed with pronunciations de, dí, and dì.

An exemplary phoneme pronunciation dictionary is shown in FIG. 3. Accordingly, the phoneme sequences 108 can be converted into one or more token sequences 112. Furthermore, acoustic model 106 can assign sentence-level acoustic scores to the phoneme sequence hypotheses and the token sequences 112. The sentence-level acoustic score can indicate an estimated speech recognition accuracy for the phoneme sequence in representing the utterance.

As shown in FIG. 1, via token score computation 125, the ASR system 100 can generate one or more token sequences 127 with token confidence scores. Both the token sequences 112 with the sentence-level acoustic scores and the token sequences 127 with token confidence scores can be further processed by a translation model 129.

According to some embodiments, the translation model 129 can be a sequence-to-sequence neural network model that has been trained by relevant datasets or finetuned by relevant datasets from a general model. For example, the training datasets can comprise lower-score textual transcriptions mapped do higher-score transcriptions for an utterance. According to some embodiments, the trained translation model 129 can determine that a token confidence score of a token or word is below a threshold that can be empirically predetermined or dynamically adapted. In some embodiments, the threshold is the confidence score associated with a different token or phrase. Furthermore, the system can, via a translation model, determine a substitute token for the low-score token and update the token sequence by replacing the low-score token with the substitute token. According to some embodiments, the system can compare the phoneme sequence of the low-score token with phoneme sequences of tokens that have a small edit distance (high similarity). With this approach, the substitute token can have a similar sound to the low-score token.

According to some embodiments, a general-purpose Natural Language Generator (NLG) model can be used to generate and predict the substitution word or token based on the remaining tokens. The Generative Pretrained Transformer 3 (GPT-3) can be an example of a general-purpose NLG model. The general-purpose NLG model can be trained with a large amount of general textual data so that it can learn the grammatical structures and semantics of a language, which can be used to predict the next word or phrase after a sequence of words or a missing word in a sentence. According to some embodiments, finetuning a NLG model can be the process of updating the parameters of a general-purpose NLG model to improve accuracy with domain-specific data. The finetuning process can, for example, adjust the weights of the general-purpose NLG model so that the finetuned model can account for the characteristics of the domain-specific data and target purpose.

According to some embodiments, the general-purpose NLG model can be finetuned with mass linguistic data that is specific for a domain or an application. As the general pattern of a language can be different from the specific language used in a specific domain or target purpose, the general-purpose NLG model can be finetuned to create a model better suited for its own domain and target purpose. For example, an NLG model for a virtual assistant in an automobile can be trained with transcriptions and voice queries that are typical for a driver. According to some embodiments, the training datasets can be multi-domain so that the ASR system can be a general one.

As such, based on the learned language patterns, the finetuned NLG model can generate a substitute word with a higher token score that is more probably correct based on the remaining tokens. For example, the exemplary sentence has "Uber" instead of "Over."

According to some embodiments, the system can generate several substitution tokens to replace the low-score token, which can result in one or more new hypothetical phoneme sequences with corresponding sentence-level acoustic scores. The potential substitution tokens can be assigned to individual token scores to indicate a likelihood of correctness.

According to some embodiments, the system can substitute another token related to the low-score token so that the transcription is likely correct. For example, in the original "Order an over to San Francisco" transcription, the system can replace "Order an" with "Get me" so the transcription reads "Get me over to San Francisco". By substituting another token/phrase, the token confidence score of "over" can be increased.

According to some embodiments, instead of directly modifying the low-score token, the ASR system 100 can keep the original phoneme sequence and make a duplicate copy of it for token substitution. As such, the original phoneme sequence can be further evaluated by the following statistical language models and/or NLU to avoid inadvertent data loss.

According to some embodiments, with the translated or updated token sequences 131, the ASR system 100 can reassign the respective sentence-level acoustic scores to individual phoneme sequences. According to some embodiments, the sentence-level acoustic score can be an average of token confidence scores. According to some embodiments, the sentence-level acoustic score can be a product of token confidence scores. According to some embodiments, the sentence-level acoustic score can be related to the token confidence scores and other scores/factors such as modulation, prosody, accent, etc. According to some embodiments, a hybrid score based on the token confidence score and the sentence-level acoustic scores can be used to rank the candidate phoneme sequences.

According to some embodiments, the translated token sequences 131, along with their respective sentence-level acoustic scores, can be further evaluated by one or more statistical language models 132. With token sequence probability analysis, statistical language model 132 can assign sentence-level probability scores, i.e., LM scores, to indicate an estimated speech recognition accuracy. For example, statistical language model 132 can be a N-gram LM pre-trained with text data, which can be processed in conjunction with beam search decoding to determine the most probable transcription candidate.

As shown in FIG. 1, via comprehensively comparing scores and selecting token sequence 133, the ASR system 100 can generate a selected token sequence 134 as the preferred transcription of the utterance. Furthermore, the ASR system 100 can select the token sequence 134 from the translated token sequences 131 or the ASR token sequences 112.

According to some embodiments, a general acoustic model 105 can be an infused neural network model that can simultaneously assign both sentence-level acoustic scores and token confidence scores to the phoneme sequence hypotheses 108. The general acoustic model 105 can generate a list of phoneme sequence hypotheses with assigned acoustic scores and token scores for processing by translation model 129 and/or statistical language model 132.

According to some embodiments, textual transcriptions from the ASR system 100 or phoneme probabilities can be further subject to natural language processing based on grammars or neural models to determine their semantic meanings. Accordingly, based on the inferred semantic meanings of the selected token sequence 134, a response or action can be determined or performed in response.

Figure 2A:
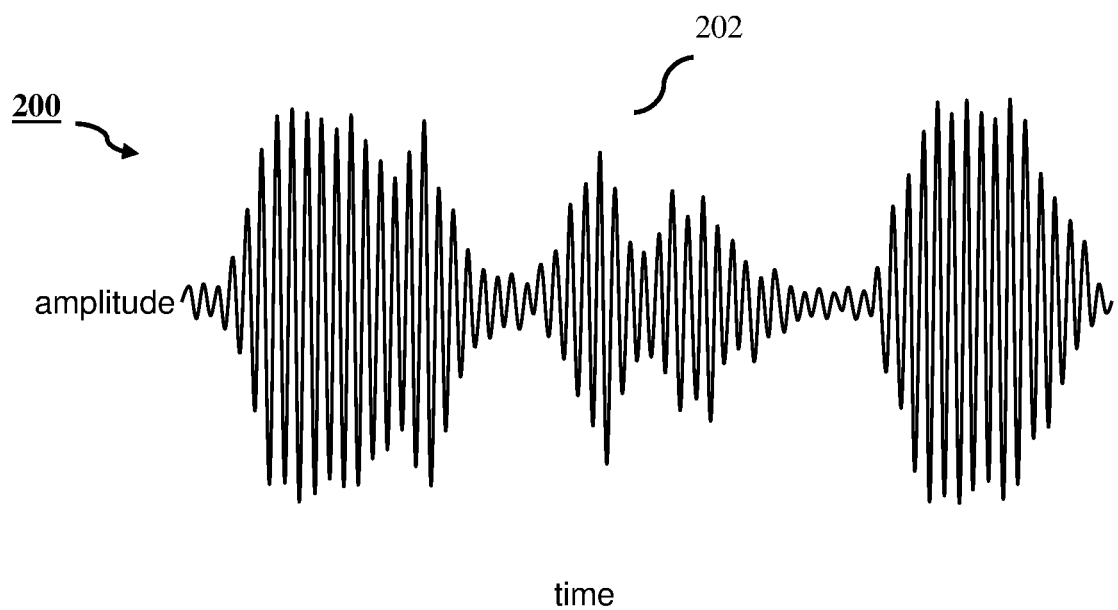
FIG. 2A shows an exemplary speech or utterance audio waveform, according to one or more embodiments of the present subject matter.
Figure 2B:
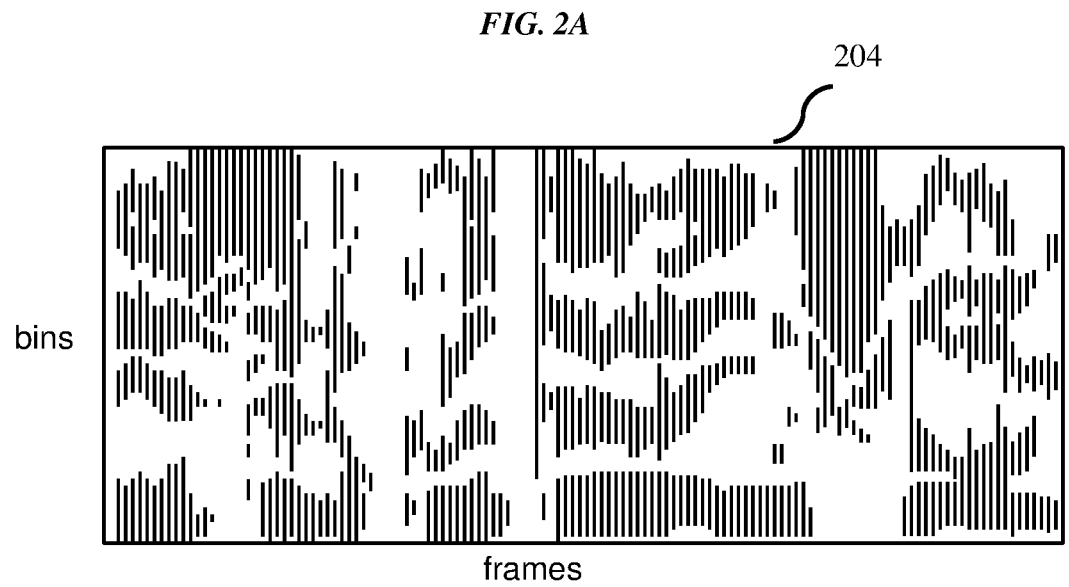
FIG. 2B shows an exemplary speech audio spectrogram.

FIG. 2A shows a diagram 200 an exemplary audio waveform 202 of a speech or utterance. The audio wave 202 can be represented in an audio file or audio stream of the utterance. FIG. 2B shows an exemplary speech audio spectrogram. Upon receiving the audio file of the utterance, an ASR system can pre-process the audio file into acoustic feature spectrogram 204 as shown in FIG. 2B.

An acoustic feature spectrogram is a representation of the amount of energy at each of multiple frequency ranges in a series of windowed frames of sampled sound. According to some embodiments, the acoustic feature spectrogram can be generated by dividing the audio signal into overlapping frames at a fixed interval, e.g., 10 ms and overlapping window size of 25 ms, generating short-time Fourier transform of each windowed frame, and computing the power spectrum of each frame. The acoustic feature spectrogram 204 can be the input data for the ASR system and the acoustic model(s).

FIG. 3 shows a listing of phonemes 300 of the Carnegie Mellon University's standard English phoneme codes. This is for convenient reference for understanding the following descriptions of phoneme sequences.

Figure 4:
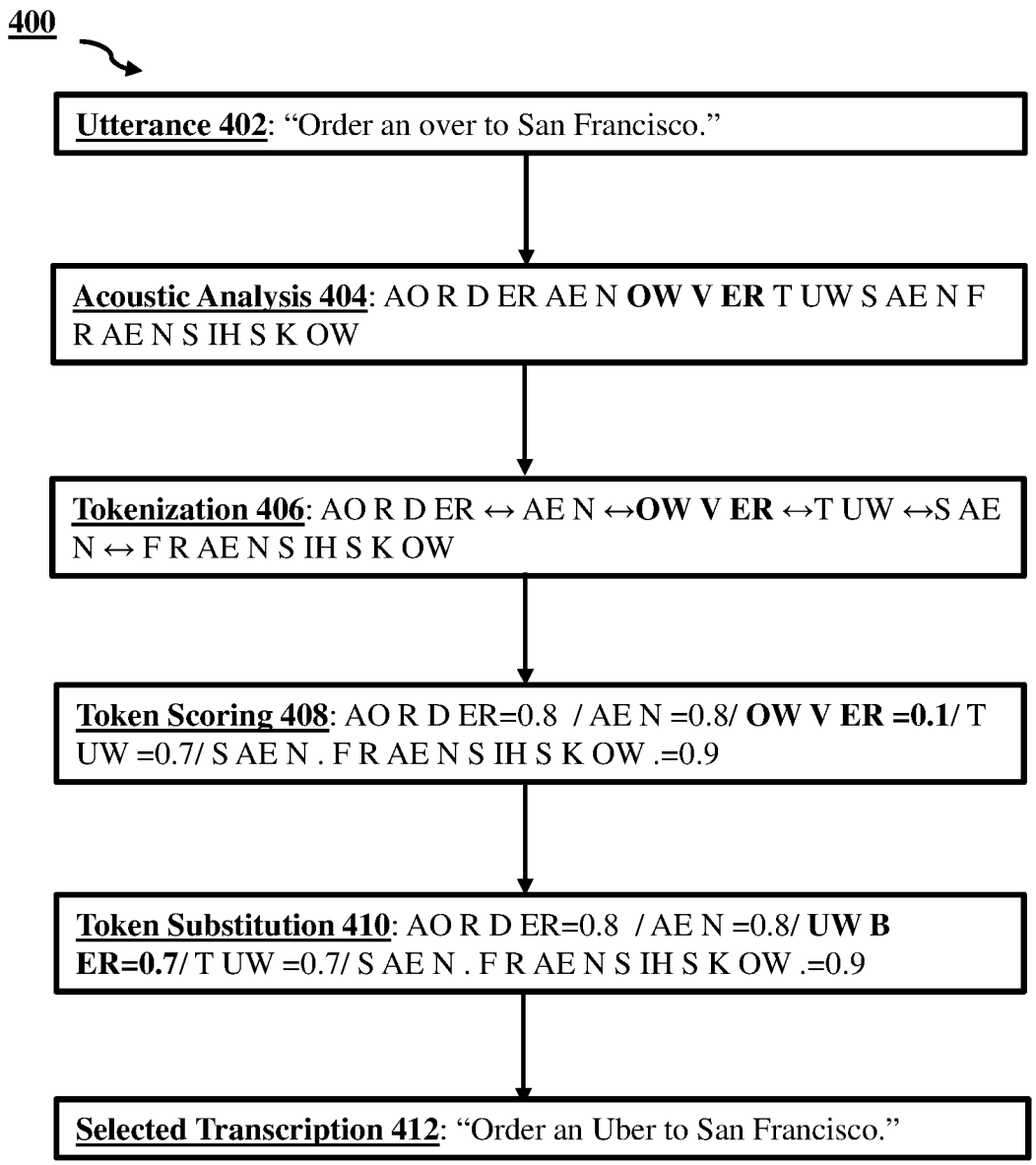
FIG. 4 shows an exemplary diagram of token confidence score assignment and substitution, according to one or more embodiments of the present subject matter.

FIG. 4 shows an exemplary diagram 400 of token confidence score assignment and substitution. At step 402, an acoustic model of the ASR system can receive a user's voice query or utterance for "Order an over to San Francisco." There is likely a recognition error for "over" as the word is not semantically reasonable in this query. A recognition error can be caused by various acoustic uncertainties, including unclear pronunciation, a foreign accent or interfering background noises, etc.

At step 404, the acoustic model can conduct acoustic analysis to convert the processed utterance data into one or more phoneme sequence hypotheses. For example, a hypothetical phoneme sequence can be "AO R D ER AE N OW V ER T UW S AE N F R AE N S IH S K OW."

At step 406, the acoustic model can conduct tokenization by segmenting the hypothetical phoneme sequence into a token sequence based on the phoneme pronunciation dictionary. For example, the token sequence can be "AO R D ER↔AE N↔OW V ER↔T UW↔S AE N↔F R AE N S IH S K OW."

Furthermore, the acoustic model can assign sentence-level acoustic scores to each of the phoneme sequence hypotheses and the token sequences. For example, the sentence-level acoustic score of "AO R D ER↔AE N↔OW V ER↔T UW↔S AE N↔F R AE N S IH S K OW" can be 3.3, or a number indicating a relative estimated accuracy for this phoneme sequence among the list of the phoneme sequence hypotheses.

At step 408, the acoustic model or a token confidence model can assign respective token confidence scores to individual tokens in the token sequence. The token confidence score can indicate an estimated speech recognition accuracy for a tokenized word. The token confidence score can be binary scores between 0-1. For example, AO R D ER=0.8/AE N=0.8/OW V ER=0.1/T UW=0.7/ S AE N . F R AE N S IH S K OW .=0.9.

At step 410, the ASR system, e.g., via a translation model, can determine a sentence with a substitute token for the low-score token and update the token sequence by replacing the low-score token with the substitute token. For example, the system can determine that the token confidence 0.1 of OW V ER is unusually small compared with the average token confidence score, e.g., 0.5. The system can determine a substitute token "UW B ER" with a similar phoneme sound with "OW V ER", wherein the substitute token is assigned to a higher token confidence score, i.e., 0.7.

This can be accomplished by having a weighted mapping between phonemes based on their likelihood of confusion. For example, OW and UW have a high likelihood of confusion and V and B have a high likelihood of confusion whereas OW and T have a low likelihood of confusion. The confusion likelihood weights can be applied to rescoring of potential translations. However, with sufficient training, a neural network model in effect can learn knowledge of confusion likelihood between different phonemes.

According to some embodiments, the system can generate several substitution tokens to replace the low-score token. The potential substitution tokens can be assigned to individual token scores. According to some embodiments, the system can substitute a different token related to the low-score token "OW V ER" so that the transcription is likely correct. For example, in the original token sequence "Order an over to San Francisco" transcription, the system can replace "Order an" with "Get me" so the transcription reads "Get me over to San Francisco." By substituting another token/phrase, the token confidence score of "OW V ER" in "Get me over to San Francisco" can be increased.

According to some embodiments, with the updated token sequence "AO R D ER=0.8/AE N=0.8/UW B ER=0.7/T UW=0.7/S AE N . F R AE N S IH S K OW .=0.9", the system can reassign the sentence-level acoustic scores based on the updated token sequence.

At step 412, the system can select the updated phoneme sequence with the highest sentence-level acoustic scores as the likely correct text transcription for the utterance of "Order an over to San Francisco." In this example, the corrected phoneme sequence can be "Order an Uber to San Francisco."

According to some embodiments, the system can select one or more text transcriptions with acoustic scores higher than a threshold. In some embodiments, the threshold is the acoustic score associated with a different text transcription. The selected text transcriptions can be further evaluated by one or more statistical language models (LMs), which can assign sentence-level probability scores to indicate an estimated speech recognition accuracy. As such, the system can select a text transcription with a high acoustic score and a high LM score.

FIG. 5 shows an exemplary diagram 500 of phrase confidence score assignment and substitution. At step 502, the ASR system can receive a user's voice query or utterance for "Tell me symptoms of coke at nineteen." There is likely a recognition error for "coke at nineteen" as "Covid-19" is not in the ASR's dictionary.

At step 504, the ASR system can conduct acoustic analysis to convert the processed utterance data into one or more phoneme sequence hypotheses. For example, a hypothetical phoneme sequence can be "T EH L M IY S IH M P T AH M Z AH V K OW K AE T N AY N T IY N."

At step 506, the ASR system can conduct tokenization by segmenting the hypothetical phoneme sequence into a token and phrase sequence based on the phoneme pronunciation dictionary. For example, the token sequence can be "T EH L↔M IY↔S IH M P T AH M Z↔AH V↔K OW K↔AE T↔N AY N T IY N." Here, "K OW K↔AE T↔N AY N T IY" is a phrase comprising several tokens.

Furthermore, the ASR system can assign sentence-level acoustic scores to the phoneme sequence hypotheses and the token sequences. For example, the sentence-level acoustic score of "T EH L↔M IY↔S IH M P T AH M Z↔AH V↔K OW K↔AE T↔N AY N T IY N" can be 3.1, or any number indicating a relative estimated accuracy for this phoneme sequence among the list of the phoneme sequence hypotheses.

At step 508, the ASR system can assign respective token confidence scores and phrase confidence scores to individual tokens and phrases. The token/phrase confidence score can indicate an estimated speech recognition accuracy for a tokenized word or phrase. The token/phrase confidence score can be binary scores between 0-1. For example, T EH L=0.7↔M IY=0.8↔S IH M P T AH M Z=0.7↔AH V=0.7↔[K OW K↔AE T↔N AY N T IY N]=0.2.

At step 510, the ASR system can determine that a phrase confidence score is low, determine a substitute phrase for the low-score phrase and update the token/phrase. For example, the system can, via the translation model, determine that the phrase confidence 0.2 of [K OW K↔AE T↔N AY N T IY N] is unusually small compared with the average token/phrase confidence score, e.g., 0.5. The translation model can determine a substitute token "[K OW VIY D↔N AY N T IY N]" with a similar phoneme sound, wherein the substitute phrase is assigned to a higher phrase confidence score, i.e., 0.8.

According to some embodiments, the system can generate several substitution phrases to replace the low-score phrase. According to some embodiments, the system can substitute another token or phrase related to the low-score phrase "[K OW K↔AE T↔N AY N T IY N]" so that the transcription is likely correct. By substituting another phrase, the token confidence score of "[K OW K↔AE T↔N AY N T IY N]" can be increased.

According to some embodiments, with the updated token sequence "T EH L=0/7↔M IY=0.8↔S IH M P T AH M Z=0.7↔AH V=0.7↔[K OW VIY D↔NAY N T IY N]=0.8", the system can reassign the sentence-level acoustic scores based on the updated token/phrase sequence.

At step 512, the ASR system can select the updated phoneme sequence with the highest sentence-level acoustic scores as the likely correct text transcription for the utterance of "Tell me symptoms of coke at nineteen." In this example, the corrected phoneme sequence can be "Tell me symptoms of Covid-19."

According to some embodiments, the ASR system can select one or more text transcriptions with acoustic scores higher than a threshold for further evaluation by statistical language models. Statistical language models can assign sentence-level probability scores to indicate an estimated speech recognition accuracy. As such, the system can select a text transcription with a high acoustic score and LM score.

Figure 6:
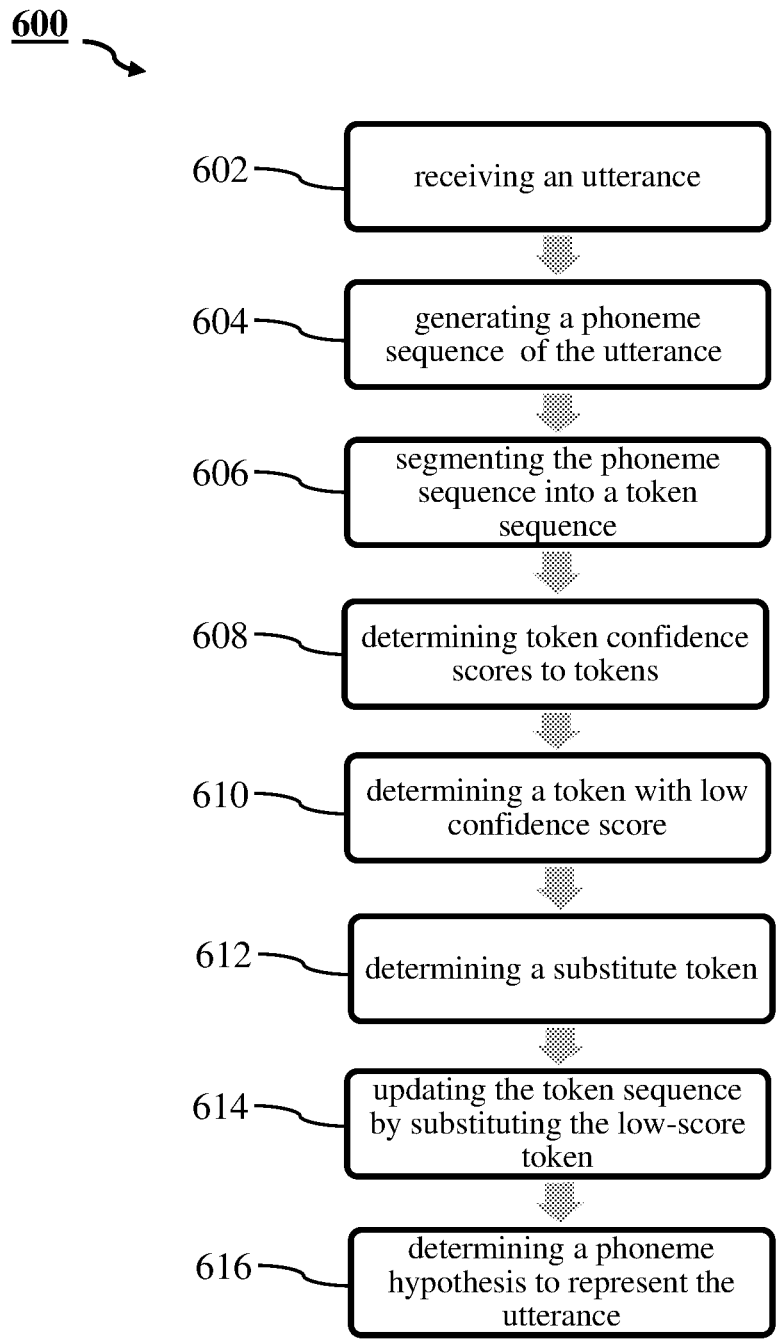
FIG. 6 shows an exemplary process of automatically correcting words by generating token confidence scores and substituting weak token(s), according to one or more embodiments of the present subject matter.

FIG. 6 shows an exemplary process 600 of automatically correcting words by generating token confidence scores and substituting weak token(s). At step 602, the system can receive an utterance of a voice query to transcribe into a textual transcription. The utterance can comprise one more likely wrong phonemes or words that are caused by acoustic uncertainties, as explained herein. According to some embodiments, the system can receive a representation of the speech audio of the utterance. An example of such data representation can be a spectrogram as shown in FIG. 2B.

At step 604, the system can generate a phoneme sequence hypotheses based on the speech audio. Each of the phoneme hypotheses is a probable transcription of the speech audio. The system can assign sentence-level acoustic scores to individual phoneme sequence hypotheses. The sentence-level acoustic score can indicate an estimated speech recognition accuracy for the phoneme sequence.

At step 606, the system can segment a phoneme sequence into a token sequence based on one or more phoneme pronunciation dictionaries.

At step 608, the system can assign respective token confidence scores to individual tokens in the token sequence. The token confidence score can indicate an estimated speech recognition accuracy for a tokenized word. According to some embodiments, the token confidence score can be binary scores between 0-1.

The system can adopt various methods and approaches to generate the token confidence scores. For example, posterior probabilities of sub-word units can be used to generate the token confidence scores. In another example, utterance verification in continuous speech recognition can be used to generate the token confidence score. For example, the token confidence score can be the arithmetic mean of the phone log posterior probabilities.

According to some embodiments, a trained neural network model, e.g., a confidence score model, can generate the token confidence scores. For example, a trained or finetuned binary classifier model can infer the accuracy probabilities of the individual tokens with assigned token confidence scores. The classifier model can be trained by training data, including domain-specific data, positive datasets, negative datasets and/or unlabeled datasets. According to some embodiments, the positive datasets comprise confirmed transcriptions combined with the utterance. Furthermore, the training datasets for the confidence score model can comprise foreign language data so that the system can work in a foreign language or multilingual environment.

At step 610, the system can determine that a token confidence score is below a threshold that can be empirically predetermined or dynamically adapted. In some embodiments, the threshold is the confidence score associated with a different token. For example, the system can set the threshold as the average token confidence in a token sequence.

At step 612, the system can determine a substitute token for the low-score token, e.g., via a translation model. For example, the system can compare the phoneme sound of the low-score token with tokens with a similar sound. With this approach, the substitute token can have a similar sound to the low-score token. In addition, the substitute token has a higher token confidence score according to the token confidence model or any other score assignment approach.

According to some embodiments, the translation model can be a general-purpose NLG model for generating and predicting the substitution word or token based on the remaining tokens. The general-purpose NLG model can be finetuned with a large amount of general textual data so that it can learn the grammatical structures and semantics of a language. For example, the training datasets can comprise lower-score textual transcriptions mapped to higher-score transcriptions for an utterance so that the model can learn the corresponding language patterns.

According to some embodiments, the general-purpose NLG model can be finetuned with mass linguistic data that is specific for a domain or an application or it can be finetuned with multi-domain data so that the ASR system can be multi-purpose. As such, based on the learned language patterns, the finetuned NLG model can generate a transcription having a substitute word with a higher token score that is more probably correct in the context of the remaining tokens.

According to some embodiments, the system can generate several substitution tokens to replace the low-score token. The potential substitution tokens can be assigned to individual token scores to indicate a likelihood of correctness. According to some embodiments, the system can substitute another token related to the low-score token so that the transcription is likely correct. For example, in the original "Order an over to San Francisco" transcription, the system can replace "Order an" with "Get me" so the transcription reads "Get me over to San Francisco." By substituting another token/phrase, the token confidence score of "over" can be increased.

At step 614, the system can update the token sequence by replacing the low-score token with the substitute token. According to some embodiments, the original token sequence can be replaced by the substituted token sentence. According to some embodiments, instead of directly modifying the low-score token, the system can keep the original phoneme sequence and compute an alternative to it for token substitution or correction. This way, the original phoneme sequence can be further evaluated together with the substituted token sequence by the following statistical language models and/or NLU.

At step 616, the system can determine a phoneme sequence hypothesis as the text transcription of the utterance. Typically, the system can select the phoneme sequence hypothesis with the highest multi-factor scores as the probable transcription. It is likely that the corrected/updated phoneme sequence corresponds to the correct text transcription. According to some embodiments, the sentence-level acoustic score can be an average of token confidence scores. According to some embodiments, the sentence-level acoustic score can be related to the token confidence scores and other scores/factors such as modulation, prosody, accent, etc. According to some embodiments, a hybrid score based on the token confidence score and the sentence-level acoustic scores can be used to rank the candidate phoneme sequences.

According to some embodiments, the updated token sequence hypotheses, along with their respective sentence-level acoustic scores and token confidence scores, can be further evaluated by one more statistical language models. With token sequence probability analysis, a statistical language model can assign sentence-level probability scores, i.e., LM scores, to indicate an estimated speech recognition accuracy. For example, a N-gram statistical language model in conjunction with beam search decoding can determine the best transcription candidate or the selected phoneme sequence hypothesis.

According to some embodiments, textual transcriptions from the ASR system can be further subject to natural language processing based on grammar or neural models to determine its semantic meaning. Accordingly, based on the inferred semantic meaning of the utterance, a response or an action can be determined or performed in response to it.

Figure 7:
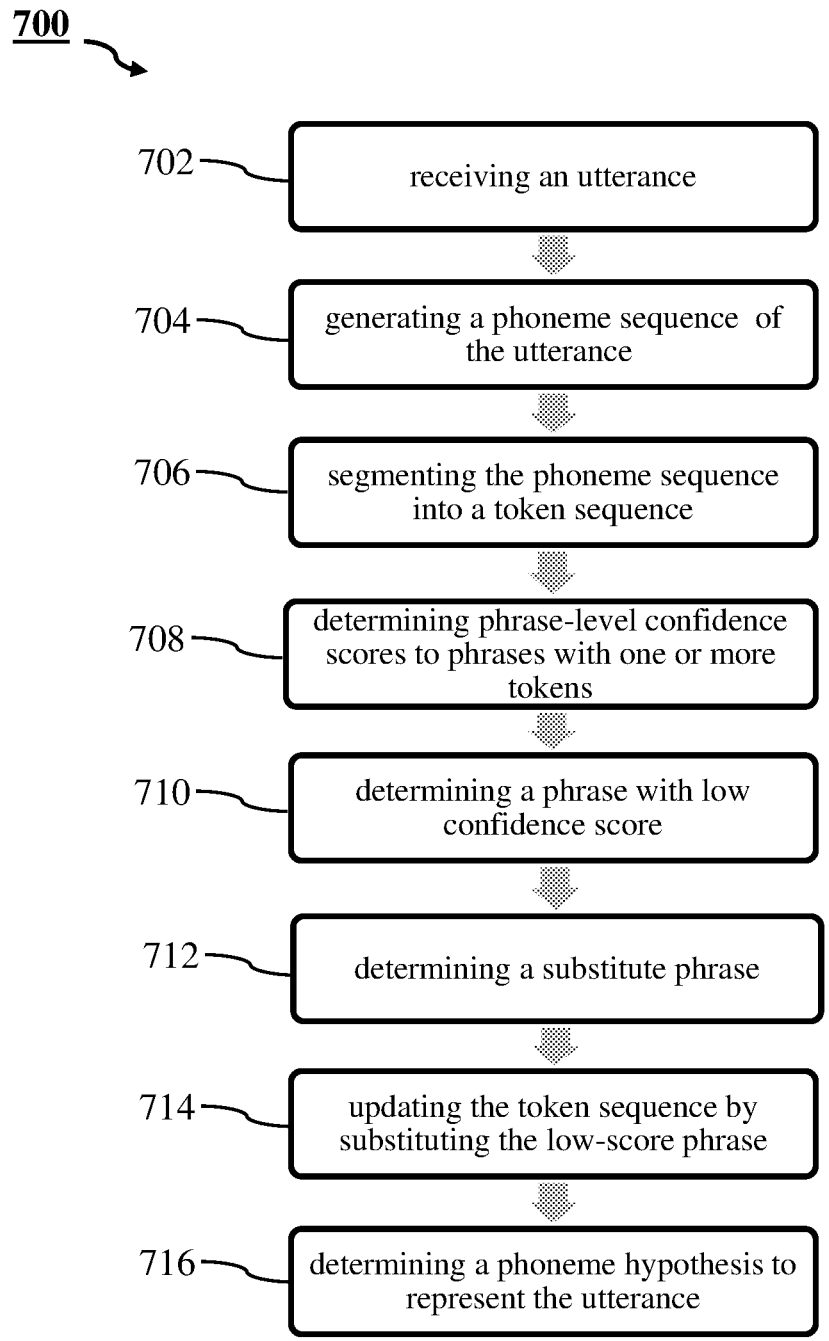
FIG. 7 shows an exemplary process of automatically correcting phrases by generating phrase confidence scores and substituting weak phrase(s), according to one or more embodiments of the present subject matter.

FIG. 7 shows an exemplary process 700 of automatically correcting phrases by generating phrase confidence scores and substituting weak phrase(s). At step 702, the system can receive an utterance of a voice query for transcription. The utterance can comprise one more likely wrong phonemes or words caused by acoustic uncertainties, as explained herein. According to some embodiments, the system can generate a representation of the speech audio of the utterance. An example of such data representation can be a spectrogram as shown in FIG. 2B.

At step 704, the system can generate a phoneme sequence hypothesis based on the speech audio. Each of the phoneme hypotheses is a probable transcription of the speech audio. The system can assign sentence-level acoustic scores to individual phoneme sequence hypotheses, which can indicate an estimated speech recognition accuracy for the phoneme sequence.

At step 706, the system can segment a phoneme sequence into a token and phrase sequence based on one or more phoneme pronunciation dictionaries. A phrase can comprise one or more tokens.

At step 708, the system can assign respective token/phrase confidence scores to individual tokens/phrases in the sequence. The phrase confidence score can indicate an estimated speech recognition accuracy for a phrase. According to some embodiments, the phrase confidence score can be binary scores between 0-1.

The system can adopt various methods and approaches for generating the phrase confidence scores. According to some embodiments, a confidence score model can generate the phrase confidence scores. For example, a trained or finetuned binary classifier model can infer the accuracy probabilities of the individual phrases with assigned phrase confidence scores. The classifier model can be trained by training data, including positive datasets, negative datasets and/or unlabeled datasets. Furthermore, the training datasets for the confidence score model can comprise foreign language data so that the system can work in a foreign language or multilingual environment.

At step 710, the system can determine that a phrase confidence score is below a threshold that can be empirically predetermined or dynamically adapted. In some embodiments, the threshold is the confidence score associated with a different token or phrase. For example, the system can set the threshold as the average token/phrase confidence in a token sequence.

At step 712, the system can determine one or more likely substitution phrases for the low-score phrase. For example, the system can compare the phoneme sound of the low-score phrase with phrases with a similar sound. With this approach, the substitute phrase can have a similar sound to the low-score phrase. In addition, a substitute phrase can have a higher phrase confidence score according to the token confidence model or any other score assignment approach. According to some embodiments, a finetuned NLG model can be adopted to generate the one or more substitution phrases.

At step 714, the system can update the token/phrase sequence by replacing the low-score phrase with the substitution phrases. According to some embodiments, the original token/phrase sequence can be replaced by the substituted token/phrase sentence. According to some embodiments, instead of directly modifying the low-score phrase, the system can keep the original phoneme sequence and make a copy of it for phrase substitution or correction. This way, the original phoneme/phrase sequence can be further evaluated with the substituted token/phrase sequence by the following statistical language models and/or NLU.

At step 716, the system can determine a phoneme sequence hypothesis as the text transcription of the utterance. Typically, the system can select the phoneme sequence hypothesis with the highest multi-factor scores as the correct transcription. It is likely that the corrected/updated phoneme sequence can be the correct text transcription.

According to some embodiments, with the updated token sequence hypotheses, the system can reassign the respective sentence-level acoustic scores to individual phoneme sequences. According to some embodiments, the sentence-level acoustic score can be an average of all token/phrase confidence scores. According to some embodiments, the sentence-level acoustic score can be related to the token/phrase confidence scores and other scores/factors such as modulation, prosody, accent, etc. According to some embodiments, a hybrid score based on the token/phrase confidence score and the sentence-level acoustic scores can be used to rank the candidate phoneme sequences.

According to some embodiments, the updated token sequence hypotheses, along with their respective sentence-level acoustic scores, can be further evaluated by one more statistical language models. With token sequence probability analysis, a statistical language model can assign sentence-level probability scores, i.e., LM scores, to indicate an estimated speech recognition accuracy. For example, a N-gram statistical language model in conjunction with beam search decoding can determine the best transcription candidate or the selected phoneme sequence hypothesis.

According to some embodiments, textual transcriptions from the ASR system can be further subject to natural language processing based on grammars or neural models to determine its semantic meaning. Accordingly, based on the inferred semantic meaning of the utterance, a response or an action can be determined or performed in response to it.

Figure 8:
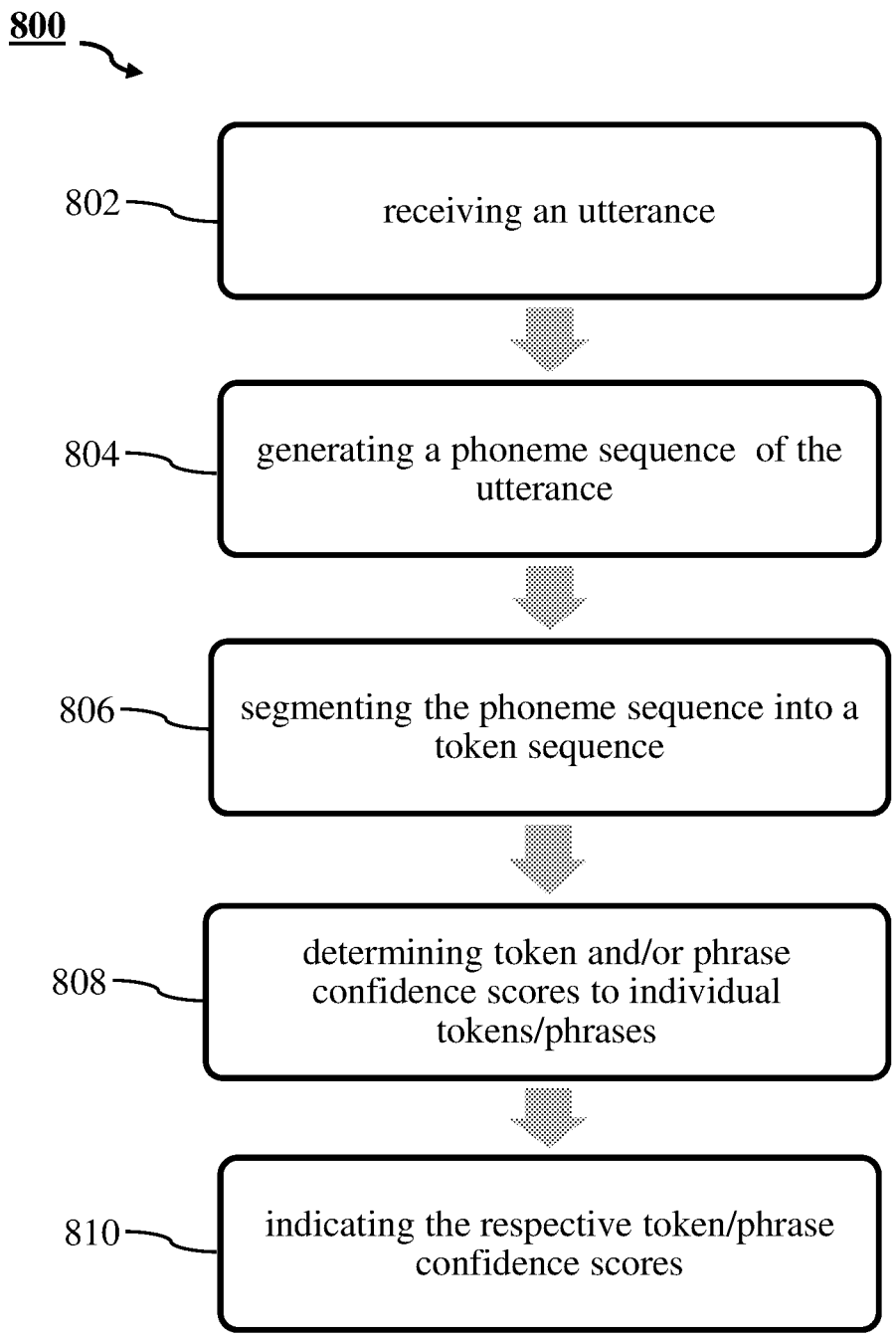
FIG. 8 shows an exemplary process of generating token/phrase confidence scores and indicating such scores to a user, according to one or more embodiments of the present subject matter.

FIG. 8 shows an exemplary process 800 of generating token/phrase confidence scores and indicating such scores to a user such as a transcription data labeler. At step 802, the system can receive an utterance of a voice query for transcription. The utterance can comprise one more likely wrong phonemes or words that are caused by acoustic uncertainties, as explained herein. According to some embodiments, the system can generate a representation of the speech audio of the utterance.

At step 804, the system can generate one or more phoneme sequence hypotheses based on the speech audio. The system can assign sentence-level acoustic scores to individual phoneme sequence hypotheses, which can indicate an estimated speech recognition accuracy for the phoneme sequence hypotheses.

At step 806, the system can segment a phoneme sequence into a token and phrase sequence based on one or more pronunciation dictionaries. At step 808, the system can assign respective token/phrase confidence scores to individual tokens/phrases in the sequence. The phrase confidence score can indicate an estimated speech recognition accuracy for a phrase.

According to some embodiments, a confidence score model can generate the phrase confidence scores. For example, a trained or finetuned binary classifier model can infer the accuracy probabilities of the individual phrases with assigned phrase confidence scores.

According to some embodiments, a translation model can determine a substitute token for a low-score token and update the phoneme sequence. The translation model can be a sequence-to-sequence neural network model that has been trained by relevant datasets. For example, the training datasets can comprise lower-score textual transcriptions combined with higher-score transcriptions for an utterance.

At step 810, the system can indicate the respective token/phrase confidence scores on a graphic interface for data labeling and dictionary enhancement. According to some embodiments, the respective token/phrase confidence scores can be used to prioritize transcription for labeling transcriptions of speech. For example, the system can determine that a phrase confidence score is below a threshold, such as the average token/phrase confidence score. The system can indicate the low-score phrase by displaying it with a color or font that is different from the remaining phrases/tokens. The token confidence scores can also be shown.

Figure 9:
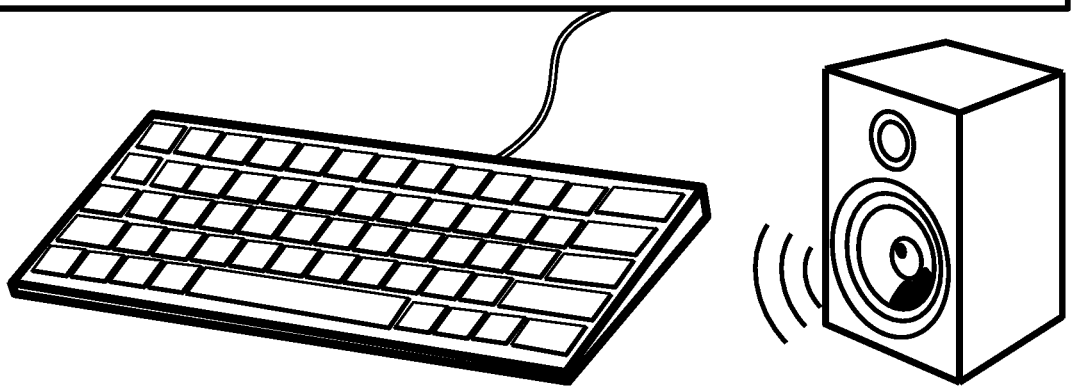
FIG. 9 shows an exemplary user interface for data labeling and dictionary enhancement, according to one or more embodiments of the present subject matter.

FIG. 9 shows a display for data labeling. It can be used by a data labeler to check and correct transcriptions. The checked and corrected transcriptions can be used to train, re-train, and otherwise improve speech recognition models. The data labeler can listen to a recording of the speech audio using a speaker and reads one or more candidate transcriptions on a display. The labeler then can use an input device, e.g., a keyboard, to confirm a transcription out of one or more listed transcriptions as being correct for the audio recording. In the example shown, the confidence score model indicated low confidence in the phoneme and word token recognition for the part of the audio corresponding to the hypothesized word "over". For example, the word with a low confidence score can be shown in the transcription in a lighter and italicized font. The system can computed a sentence confidence score of 12/100 using a statistical language model.

The system can also generate a translation or substitution of the hypothesized sentence. The translation can be performed using a model that considers both the recognized word tokens and a confidence score for each token. The display can show the translated sentence, which is the same except for the word "over" being replaced with the word "Uber". The statistical language model can calculate a sentence confidence score of 79/100. Because the word "Uber" appears in the translated sentence but not the hypothesized sentence, the system can highlight it, e.g., in an underlined font style. This can provide a clue to the data labeler that the audio for that word was highly uncertain and it has been automatically changed by the system, i.e., by replacing "over" with "Uber".

According to some embodiments, the respective token confidence scores can be used to detect labeling errors. For example, a low confidence score can indicate there is likely a labeling error and thus can be highlighted in red. This will enable easier correction by the developer or the data labeling staff.

According to some embodiments, the system can determine that a token with a low token confidence score is a new word that the pronunciation dictionary does not comprise, e.g., "Covid-19". Accordingly, the new word can be added to the dictionary so that it will be easily identified next time.

Figure 10A:
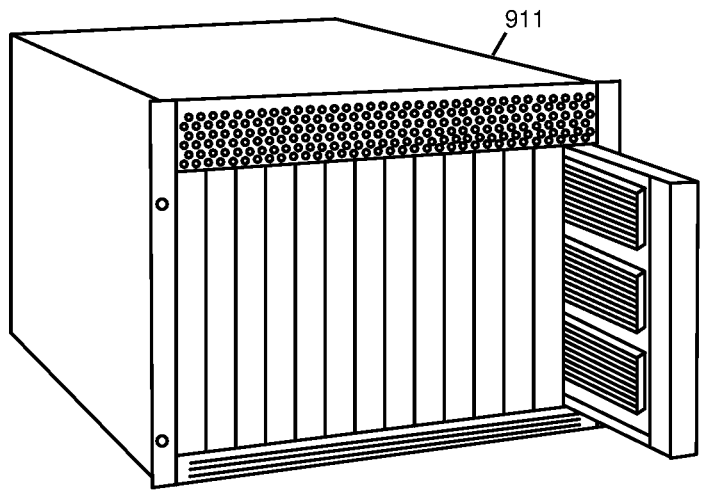
FIG. 10A shows a server system of rack-mounted blades, according to one or more embodiments of the present subject matter.

FIG. 10A shows a server system of rack-mounted blades. Various examples are implemented with cloud servers, such as ones implemented by data centers with rack-mounted server blades. FIG. 9A shows a rack-mounted server blade multi-processor server system 911. Server system 911 comprises a multiplicity of network-connected computer processors that run software in parallel.

Figure 10B:
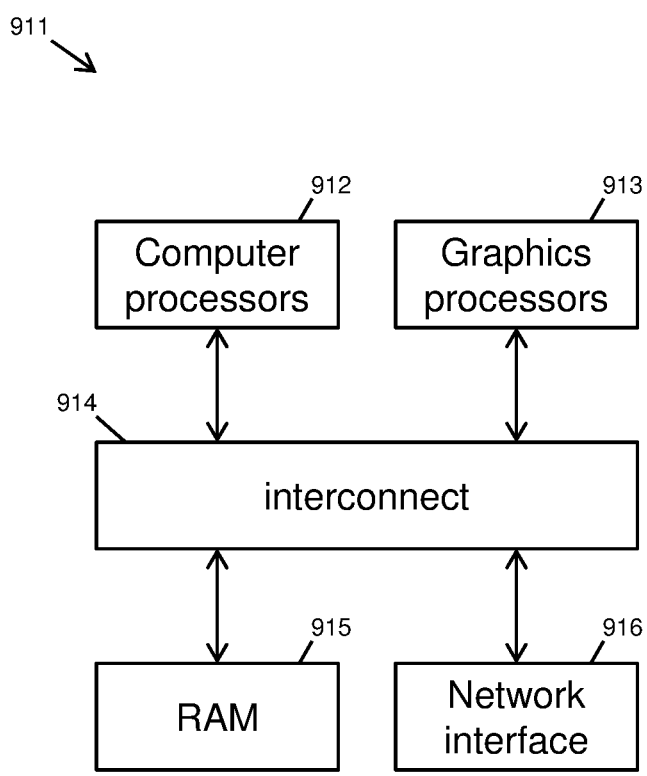
FIG. 10B shows a diagram of a networked data center server, according to one or more embodiments of the present subject matter.

FIG. 10B shows a diagram of a server system 911. It comprises a multicore cluster of computer processors (CPU) 912 and a multicore cluster of the graphics processors (GPU) 913. The processors connect through a board-level interconnect 914 to random-access memory (RAM) devices 915 for program code and data storage. Server system 911 also comprises a network interface 916 to allow the processors to access the Internet, non-volatile storage, and input/output interfaces. By executing instructions stored in RAM devices 915, the CPUs 912 and GPUs 1033 perform steps of methods described herein.

Figure 11A:
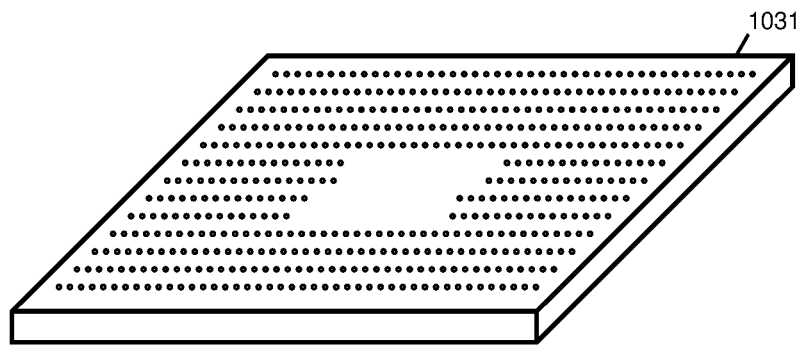
FIG. 11A shows a packaged system-on-chip device, according to one or more embodiments of the present subject matter.

FIG. 11A shows the bottom side of a packaged system-on-chip device 1031 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 11B:
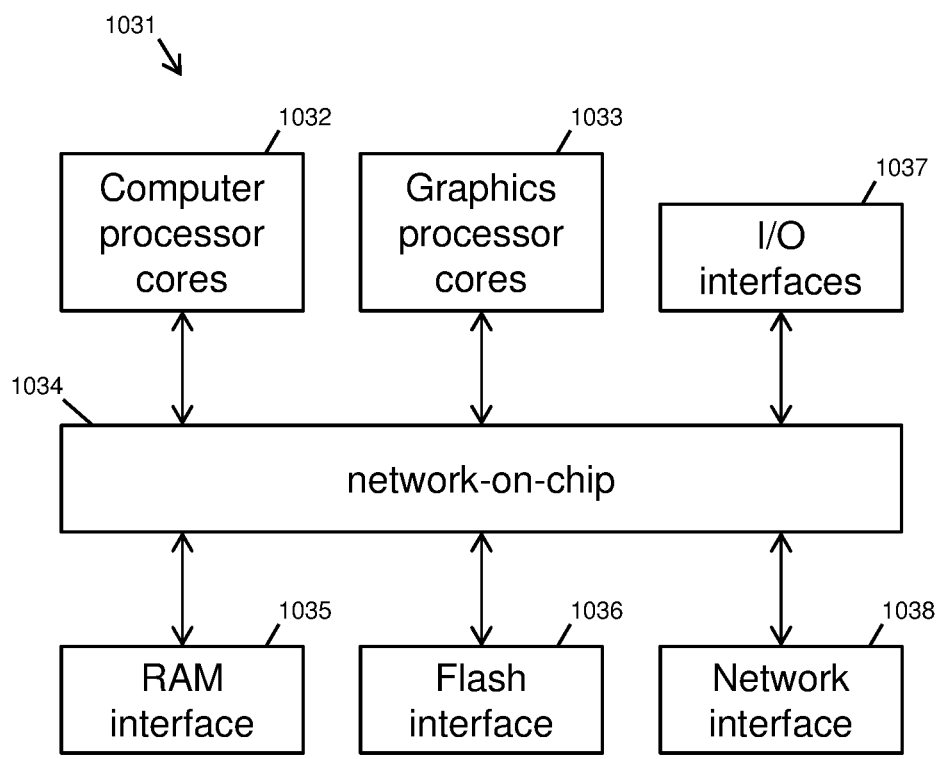
FIG. 11B shows a block diagram of a system-on-chip, according to one or more embodiments of the present subject matter.

FIG. 11B shows a block diagram of the system-on-chip 1031. It comprises a multicore cluster of computer processor (CPU) cores 1032 and a multicore cluster of graphics processor (GPU) cores 1033. The processors connect through a network-on-chip 1034 to an off-chip dynamic random access memory (DRAM) interface 1035 for volatile program and data storage and a Flash interface 1036 for non-volatile storage of computer program code in a Flash RAM non-transitory computer readable medium. SoC 1031 also has a display interface for displaying a graphical user interface (GUI) and an I/O interface module 1037 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 1031 also comprises a network interface 1038 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 1035 or Flash devices through interface 1036, the CPU cores 1032 and GPU cores 1033 perform functionality as described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Hardware blocks, custom processor instructions, co-processors, and hardware accelerators perform neural network processing or parts of neural network processing algorithms with especially high performance and power efficiency. This enables extended battery life for battery-powered devices and reduces heat removal costs in data centers that serve many client devices simultaneously.

Several aspects of one implementation of the neural sentence generator and its applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method for speech recognition, comprising:
   receiving, at an automatic speech recognition system, an utterance;
   generating, based on an acoustic model, a phoneme sequence of the utterance;
   generating, based on the acoustic model, a plurality of phoneme sequences of the utterance that comprise the phoneme sequence;
   assigning sentence-level acoustic scores to individual phoneme sequences to indicate the likelihood of correctness to represent the utterance;
   segmenting the phoneme sequence into a token sequence that represents the phoneme sequence based on a pronunciation dictionary;
   assigning respective token confidence scores to individual tokens in the token sequence, wherein a token confidence score represents a level of confidence of the correct representation of a tokenized word;
   determining that a first confidence score associated with a token is lower than a predetermined threshold;
   determining a substitute token associated with a second confidence score that is higher than the first confidence score; and
   updating the token sequence by replacing the token with the substitute token.

2. The computer-implemented method of claim 1, following updating the token sequence, further comprising:
   reassigning the respective sentence-level acoustic scores to individual phoneme sequences; and
   determining a phoneme hypothesis from the plurality of phoneme sequences to represent the utterance.

3. The computer-implemented method of claim 1, wherein a confidence score model assigns the respective token confidence scores to individual tokens in the token sequence.

4. The computer-implemented method of claim 1, wherein a translation model determines the substitute token and update the token sequence by replacing the token with the substitute token.

5. The computer-implemented method of claim 1, wherein the token confidence scores are based on one or more of a token sequence probability analysis, acoustic probability analysis, and semantic analysis.

6. The computer-implemented method of claim 1, further comprising:
   generating, based on the phoneme sequence, a text transcription of the utterance.

7. A computer-implemented method for speech recognition, comprising:
   generating, based on an acoustic model, a plurality of phoneme sequences of an utterance;
   assigning sentence-level acoustic scores to individual phoneme sequences to indicate the likelihood of correctness to represent the utterance;
   receiving, at an acoustic model of an automatic speech recognition system, a plurality of tokens and phrases representing the utterance;
   assigning, by a confidence score model, respective token confidence scores and phrase confidence scores to the plurality of tokens and phrases, wherein a token confidence score and phrase confidence score represent a level of confidence of the correct representation of a word or phrase;
   determining, by a translation model, that a first confidence score associated with a phrase is lower than a predetermined threshold;
   determining a substitute phrase associated with a second confidence score that is higher than the first confidence score; and
   replacing the phrase with the substitute phrase to generate an updated phoneme sequence.

8. The computer-implemented method of claim 7, wherein the translation model determines a substitute token and update the token sequence by replacing the token with the substitute token.

9. The computer-implemented method of claim 7, further comprising:
   receiving the utterance of a query sentence;
   generating a phoneme sequence of the utterance; and
   segmenting the phoneme sequence into a plurality of tokens and phrases based on a pronunciation dictionary, wherein a phrase comprises one or more tokens.

10. The computer-implemented method of claim 7, following replacing the phrase with the substitute phrase, further comprising:
    reassigning the respective sentence-level acoustic scores to individual phoneme sequences; and
    determining a phoneme hypothesis from the plurality of phoneme sequences to represent the utterance.

11. A computer-implemented method for speech recognition, comprising:
    receiving, at an automatic speech recognition system, an utterance;
    generating, based on an acoustic model, a phoneme sequence of the utterance;
    generating, based on the acoustic model, a plurality of phoneme sequences of the utterance that comprise the phoneme sequence;
    assigning sentence-level acoustic scores to individual phoneme sequences to indicate the likelihood of correctness to represent the utterance;
    segmenting the phoneme sequence into a token sequence that represents the phoneme sequence based on a pronunciation dictionary;
    assigning respective token confidence scores to individual tokens in the token sequence, wherein a token confidence score represents a level of confidence of the correct representation of a tokenized word;
    determining that a first confidence score associated with a token is lower than a predetermined threshold;
    determining a substitute token associated with a second confidence score that is higher than the first confidence score;
    updating the token sequence by replacing the token with the substitute token; and
    determining a phoneme hypothesis from the plurality of phoneme sequences to represent the utterance.

12. The computer-implemented method of claim 11, wherein a confidence score model assigns the respective token confidence scores to individual tokens in the token sequence.

13. The computer-implemented method of claim 11, wherein a translation model determines the substitute token and update the token sequence by replacing the token with the substitute token.

14. The computer-implemented method of claim 11, wherein the token confidence scores are based on one or more of a token sequence probability analysis, acoustic probability analysis, and semantic analysis.

15. The computer-implemented method of claim 11, further comprising:

generating, based on the phoneme sequence, a text transcription of the utterance.

* * * * *